United States Patent
Mizuno

(10) Patent No.: US 9,286,654 B2
(45) Date of Patent: Mar. 15, 2016

(54) IMAGE SCALING PROCESSOR AND IMAGE SCALING PROCESSING METHOD

(71) Applicant: MegaChips Corporation, Osaka-shi (JP)

(72) Inventor: Yusuke Mizuno, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 0 days.

(21) Appl. No.: 14/487,535

(22) Filed: Sep. 16, 2014

(65) Prior Publication Data

US 2015/0086136 A1 Mar. 26, 2015

(30) Foreign Application Priority Data

Sep. 25, 2013 (JP) ................... 2013-198092
Sep. 3, 2014 (JP) ................... 2014-178713

(51) Int. Cl.
*G06K 9/32* (2006.01)
*G06T 3/40* (2006.01)

(52) U.S. Cl.
CPC .................... *G06T 3/4007* (2013.01)

(58) Field of Classification Search
None
See application file for complete search history.

(56) References Cited

U.S. PATENT DOCUMENTS

| 2007/0070080 A1* | 3/2007 | Graham et al. ............... 345/589 |
| 2008/0208941 A1* | 8/2008 | Koyanagi ..................... 708/313 |
| 2013/0182763 A1* | 7/2013 | Yasuda et al. ............ 375/240.12 |

FOREIGN PATENT DOCUMENTS

| JP | 10-063826 | 3/1998 |
| JP | 2000-165664 | 6/2000 |

* cited by examiner

*Primary Examiner* — Andrew Moyer
(74) *Attorney, Agent, or Firm* — Oblon, McClelland, Maier & Neustadt, L.L.P.

(57) ABSTRACT

An image scaling processor includes: a coefficient computing circuit that calculates interpolation coefficients to be used in an image scaling process; a multiplier that multiplies input image data by the interpolation coefficients provided from the coefficient computing circuit such that the interpolation coefficients respectively correspond to input pixels constituting the input image data; an adder that iteratively adds pieces of multiplied data output from the multiplier and obtains a total sum of the pieces of multiplied data for a predetermined number of the input pixels; a selector that outputs a total sum of the multiplied data at a timing at which the total sum of the pieces of multiplied data is obtained for the predetermined number of the input pixels; and a shift circuit that shifts an output of the selector to adjust a bit count of the output image data to a bit count of the input image data.

5 Claims, 14 Drawing Sheets

F I G . 1
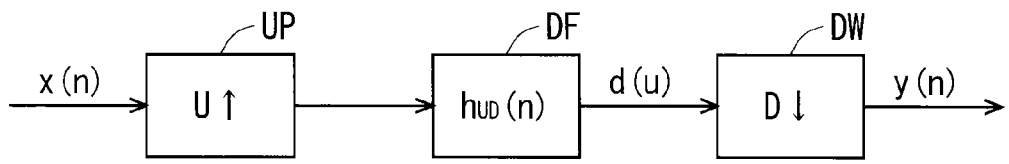
F I G . 2
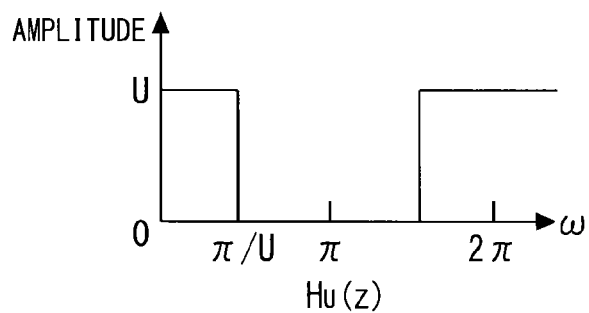
F I G . 3
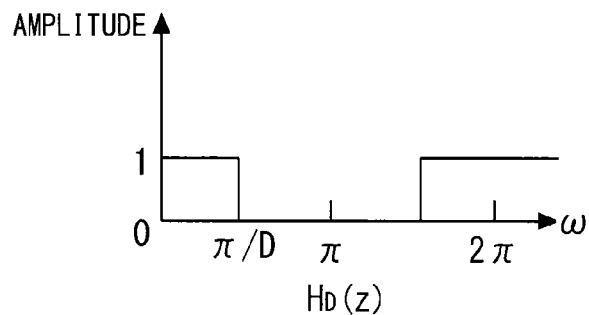
F I G . 4
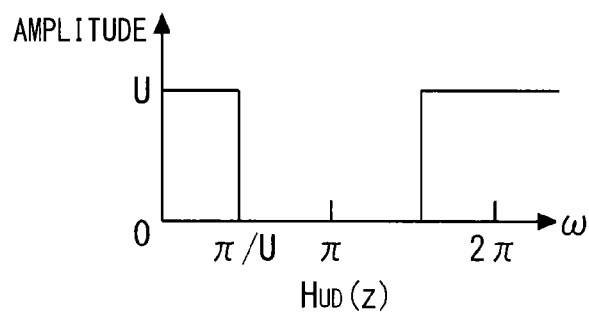

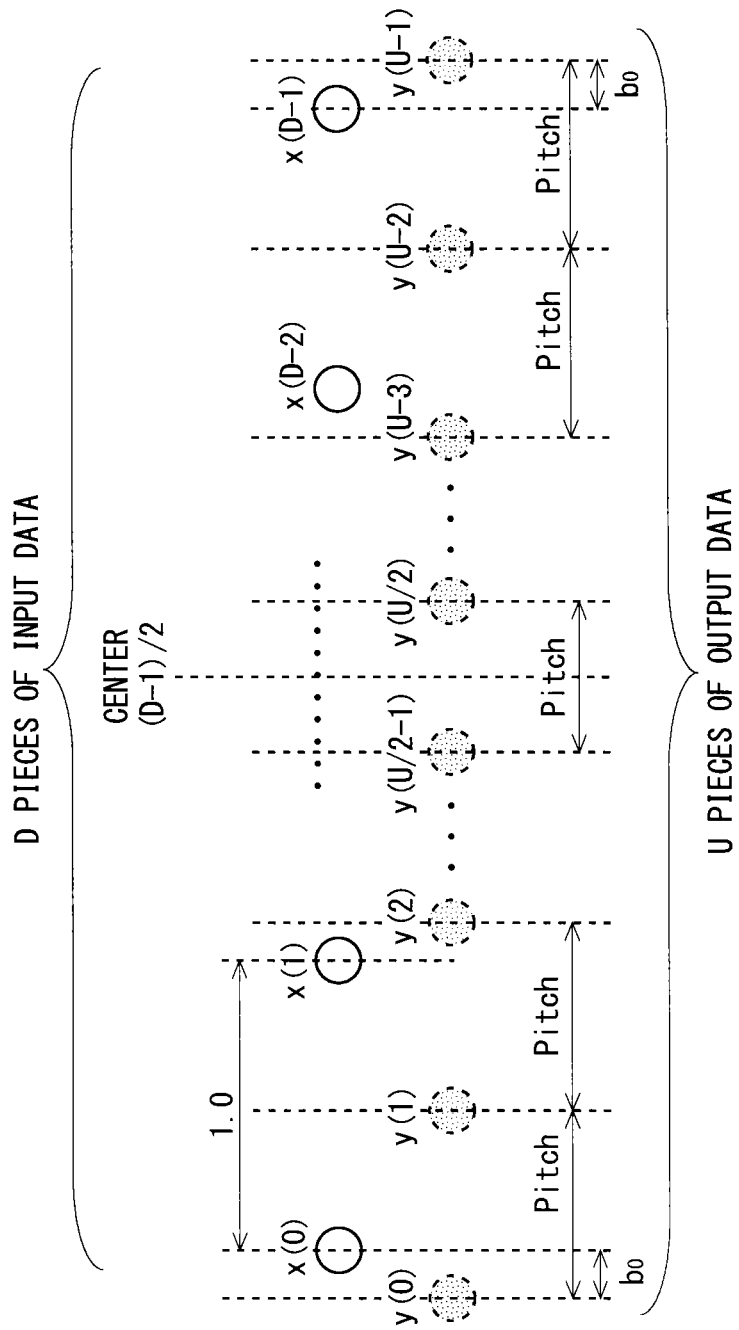
F I G. 8

F I G . 1 0
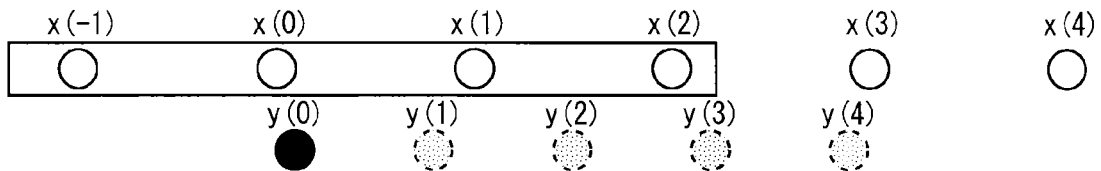
F I G . 1 1
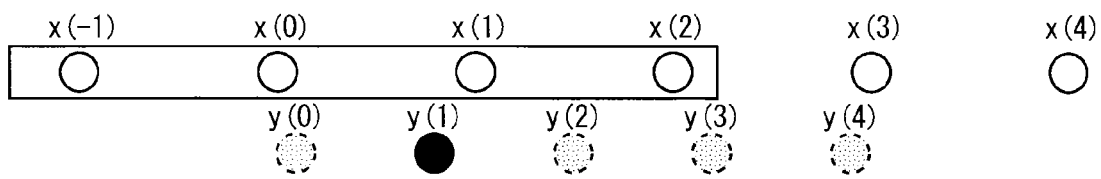
F I G . 1 2
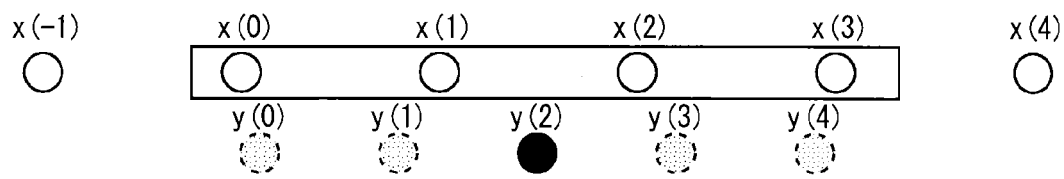
F I G . 1 3
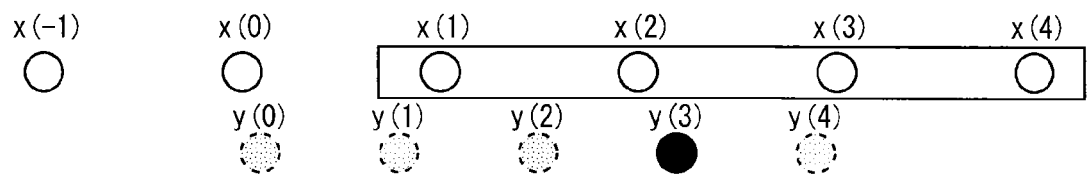

IMAGE SCALING PROCESSOR AND IMAGE SCALING PROCESSING METHOD

BACKGROUND OF THE INVENTION

1. Field of the Invention

The present invention relates to an image scaling operation device including a coefficient computing circuit that calculates an interpolation coefficient for use in an image scaling process.

2. Description of the Background Art

As disclosed in Japanese Patent Application Laid-Open No. 10-63826 (1998), typical image scaling processors follow the procedure of scaling up an original image to U times and then scaling down the image to 1/D times, to thereby perform a U/D-times arbitrary scaling process, U/D-times including integral multiple as well as a rational multiple. Unfortunately, this method requires the operation for scaling up an original image to U times as well as a memory for storing image data scaled up to U times, resulting in redundant operation and memory.

Japanese Patent Application Laid-Open No. 2000-165664 discloses the technology of directly obtaining a final image (U/D-times image) without obtaining an intermediate image (U-times image) from an original image, which solves the above-mentioned redundancy problem. However, this technology uses a conventional technique for an interpolation process, requiring a divider and a floating point unit.

As described above, the conventional image scaling process requires a divider and a floating point unit, and accordingly, the device configuration becomes complicated.

SUMMARY OF THE INVENTION

The present invention provides an image scaling processor capable of scaling an image by an arbitrary multiple without using a divider and a floating point unit.

A first aspect of the present invention relates to an image scaling processor that performs an image scaling process of interpolating pixels of input image data and converting the input image data to U/D times (U and D are natural numbers) as output image data, the processor including: a coefficient computing circuit that calculates interpolation coefficients to be used in the image scaling process; a multiplier that multiplies the input image data by the interpolation coefficients provided from the coefficient computing circuit such that the interpolation coefficients respectively correspond to input pixels constituting the input image data; an adder that iteratively adds pieces of multiplied data output from the multiplier and obtains a total sum of the pieces of multiplied data for a predetermined number of the input pixels; a selector that outputs a total sum of the pieces of multiplied data at a timing at which the total sum of the pieces of multiplied data is obtained for the predetermined number of input pixels; and a shift circuit that shifts an output of the selector to adjust a bit count of the output image data to a bit count of the input image data. The interpolation coefficients calculated by the coefficient computing circuit are converted into integers such that a total sum thereof is equal to 2 raised by a predetermined number.

In a second aspect of the image scaling processor according to the present invention: the coefficient computing circuit includes a coordinate computing circuit that calculates a coordinate of an interpolation point of a pixel to be interpolated for the input image data, and a plurality of coefficient computing circuits that respectively output interpolation coefficients corresponding to the predetermined number of the input pixels; and one of the plurality of coefficient computing circuits subtracts a sum of the interpolation coefficients calculated by the other coefficient computing circuits from a value of 2 raised by the predetermined number to calculate the other interpolation coefficient.

In a third aspect of the image scaling processor according to the present invention: the coordinate computing circuit adds D/U to the obtained coordinate of the interpolation point to calculate coordinates of subsequent interpolation points, the coordinate of first one of the subsequent interpolation points being calculated through addition of D/U to a predetermined initial value; and the coordinate computing circuit performs an operation of dropping a decimal portion of the calculated coordinate of the interpolation point, takes the operation result as a reference distance between the interpolation point and one of the predetermined number of the input pixels, calculates distances between the interpolation point and the other input pixels of the predetermined number of the input pixels based on the reference distance, and provides the other coefficient computing circuits with the calculated distances and the reference distance as distances between the interpolation point and the input pixels.

In a fourth aspect of the image scaling processor according to the present invention, the coordinate computing circuit converts a coordinate of a current interpolation point and a coordinate of a subsequent interpolation point into integers, and determines, depending on a difference value between the coordinates, the number of skips that defines to shift or not to shift a selection range in units of the predetermined number of input pixels by every predetermined number of pixels.

In a fifth aspect of the image scaling processor according to the present invention, each of the other coefficient computing circuits multiplies the distances between the interpolation point and the input pixels provided from the coordinate computing circuit and multiplies the resultant value by a predetermined coefficient to compute an interpolation function corresponding to the input distances between the interpolation point and the input pixels, and rounds off an operation result of the interpolation function, to thereby calculate an interpolation coefficient corresponding to the input distances between the interpolation point and the input pixels.

An image scaling processing method according to the present invention is the method for performing an image scaling process of interpolating pixels of input image data and converting the input image data to U/D times (U and D are natural numbers) as output image data, the method including the steps of: (a) calculating interpolation coefficients to be used in the image scaling process; (b) multiplying the input image data by the interpolation coefficients obtained in the step (a) such that the interpolation coefficients respectively correspond to input pixels constituting the input image data; (c) iteratively adding pieces of multiplied data obtained in the step (b) and obtaining a total sum of the pieces of multiplied data for a predetermined number of the input pixels; (d) outputting a total sum of the pieces of multiplied data at a timing at which the total sum of the pieces of multiplied data is obtained for the predetermined number of the input pixels; and (e) shifting the total sum of the pieces of multiplied data obtained in the step (d) to adjust a bit count of the output image data to a bit count of the input image data. The interpolation coefficients calculated in the step (a) are converted into integers such that a total sum thereof is equal to 2 raised by a predetermined number.

According to the present invention, a total sum of interpolation coefficients is converted into an integer to be equal to 2 raised by a predetermined number, so that an image can be scaled by an arbitrary multiple without using a divider and a floating point unit.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a block diagram schematically showing a U/D-times arbitrary scaling process;

FIG. 2 shows a transfer function when an images is scaled up to U times;

FIG. 3 shows a transfer function when an image is scaled down to 1/D times;

FIG. 4 shows a transfer function when an image is scaled up to U/D times;

FIG. 8 is a diagram describing the relationship between Pitch and an initial value when an image is scaled to U/D times;

FIG. 10 is a diagram describing an operation of skipping a selection range of pixel data of an input image;

FIG. 11 is another diagram describing the operation of skipping the selection range of pixel data of the input image;

FIG. 12 is still another diagram describing the operation of skipping the selection range of pixel data of the input image;

FIG. 13 is yet still another diagram describing the operation of skipping the selection range of pixel data of the input image;

DESCRIPTION OF EMBODIMENT

Introduction

The image scaling process on which the present invention is premised is described prior to the description of an embodiment.

<Example Using Transfer Function>

First, the procedure of a U/D-times arbitrary scaling process in which redundancy is eliminated is described as an exemplary image scaling process using a transfer function.

FIG. 1 is a block diagram schematically showing a U/D-times arbitrary scaling process, which is designed such that input image data x(n) is input to an up-sampler UP, the up-sampled image data is provided to a digital filter DF being a lowpass filter, image data d(n) whose band is limited by the digital filter DF is provided to a down-sampler DW, and down-sampled output image data y(n) is output.

The up-sampler UP performs a process of interpolating zero values for U−1 pixels between signals of an original image signal. The down-sampler DW performs a process of leaving every D-pixel from image data and thinning out the other pixels. An impulse response of the digital filter DF is hUD(n), and the process of FIG. 1 is expressed by Expression (1) below representing a convolution operation.

$$y(n) = \sum_{k=-\infty}^{\infty} x(k) h_{UD}(Dn - Uk) \quad (1)$$

An ideal transfer function HU(z) of a filter impulse response hU(n) when an image is scaled up to U times is shown as in FIG. 2, which is represented on a z-axis (z=exp(jωT)), and an ideal transfer function HD(z) of a filter impulse response hD(n) when an image is scaled down to 1/D times is shown as in FIG. 3. The horizontal and vertical axes in FIGS. 2 and 3 represent normalized angular frequency (w) and amplitude, respectively.

Figure 5:
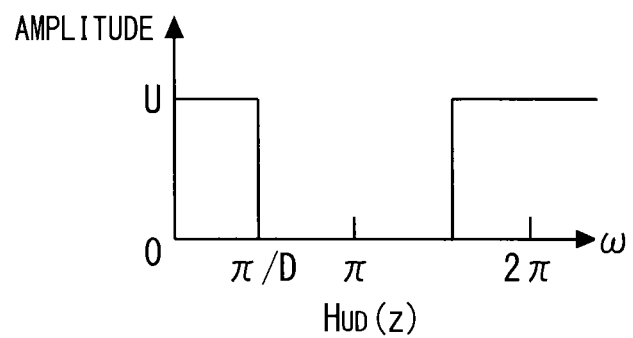
FIG. 5 shows a transfer function when an image is scaled down to U/D times.

Meanwhile, an ideal transfer function HUD(z) of a filter impulse response hUD(n) when an image is scaled up to U/D times, namely, when U>D, is shown as in FIG. 4. Also, an ideal transfer function HUD(z) of a filter impulse response hUD(n) when an image is scaled down to U/D times, namely, when U<D, is shown as in FIG. 5. The horizontal and vertical axes in FIGS. 4 and 5 represent normalized angular frequency (ω) and amplitude, respectively.

When an image is scaled up to U times, shown in FIGS. 4 and 2, the transfer function HU(z) is the same and a cutoff angular frequency is π/U. This allows the filter when an image is scaled up to U times to be used as a filter when an image is scaled up to U/D times. The cutoff angular frequency of the transfer function HUD(z) when an image is scaled down to U/D times, shown in FIG. 5, is π/D.

The filter having the impulse response hUD(n) is used as the digital filter DF as described above, which does not require two filters, namely, a filter for scaling up images and a filter for scaling down images, reducing an operation amount. Besides, an image needs not to be temporarily scaled up to U times, and accordingly, a memory for storing the image data scaled up to U times is not necessary.

In the case where an image is scaled by an arbitrary multiple, a checkerboard distortion occurs at a pixel period U if filters are not properly selected.

To avoid such a checkerboard distortion, as expressed by Expression (2) below, assuming that the impulse response hUD(n) is a delimiter for every U pixels, a transfer function is set such that a total sum of the zeroth delimiter and total sums of the first to (U−1)th delimiters each have a constant value.

$$\sum_{k=-\infty}^{\infty} h_{UD}(-Uk) = \quad (2)$$

-continued $$\sum_{k=-\infty}^{\infty} h_{UD}(1-Uk) = \ldots = \sum_{k=-\infty}^{\infty} h_{UD}(U-1-Uk) = \text{constant}$$

<Example Using Interpolation Function>

The methods of scaling an image include the method using a transfer function, as well as methods involving interpolating image data using an interpolation function, such as cubic convolution, linear interpolation, cubic interpolation, Lagrange interpolation, spline interpolation, and Lanczos interpolation.

For example, Japanese Patent Application Laid-Open No. 2001-189850 describes the exemplary interpolation using cubic convolution. The interpolation using cubic convolution is described below.

$$h(t) = \begin{cases} (a+2)|t|^3 - (a+3)|t|^2 + 1, & 0 \le |t| < 1 \\ a|t|^3 - 5a|t|^2 + 8a|t| - 4a, & 1 \le |t| < 2 \\ 0, & 2 \le |t| \end{cases} \quad (3)$$

Expression (3) above represents an interpolation function h(t) used in cubic convolution.

In Expression (3), a is a variable (−0.5 to −2) for controlling the properties of the interpolation function, and t represents the distance from each of adjacent pixels to an interpolation point.

Figure 6:
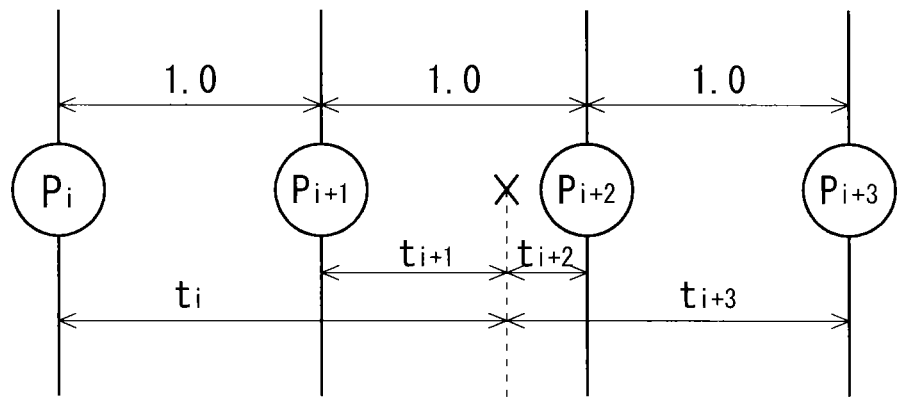
FIG. 6 is a diagram describing interpolation by cubic convolution.

FIG. 6 shows an exemplary interpolation point in cubic convolution. FIG. 6 shows the case of four pixels Pi, Pi+1, Pi+2, and Pi+3 linearly lined at equal intervals, where an interpolation point X is interpolated between the pixel Pi+1 and the pixel Pi+2.

The distances from the interpolation point X to the pixels Pi, Pi+1, Pi+2, and Pi+3 are represented by ti, ti+1, ti+2, and ti+3, respectively, and the distance between pixels is shown as 1.0. Interpolation functions h(ti), h(ti+1), h(ti+2), and h(ti+3) respectively corresponding to the above-mentioned pixels are expressed by Expression (4) below. Each of the distances ti, ti+1, ti+2, and ti+3 may also be referred to as a distance between an interpolation point and an input pixel.

$$\begin{cases} h(t_i) = a|t_i|^3 - 5a|t_i|^2 + 8a|t_i| - 4a \\ h(t_{i+1}) = (a+2)|t_{i+1}|^3 - (a+3)|t_{i+1}|^2 + 1 \\ h(t_{i+2}) = (a+2)|t_{i+2}|^3 - (a+3)|t_{i+2}|^2 + 1 \\ h(t_{i+3}) = a|t_{i+3}|^3 - 5a|t_{i+3}|^2 + 8a|t_{i+3}| - 4a \end{cases} \quad (4)$$

A total sum of the results obtained by multiplying the coordinates of the pixels Pi, Pi+1, Pi+2, and Pi+3 by the interpolation functions h(ti), h(ti+1), h(ti+2), and h(ti+3) expressed by Expression (4) above, respectively, indicates the position of the interpolation point X. The position is expressed by Expression (5) below.

$$X = P_i \times h(t_i) + P_{i+1} \times h(t_{i+1}) + P_{i+2} \times h(t_{i+2}) + P_{i+3} \times h(t_{i+3}) \quad (5)$$

Embodiment

Basic Configuration of Scaling Processor

Figure 7:
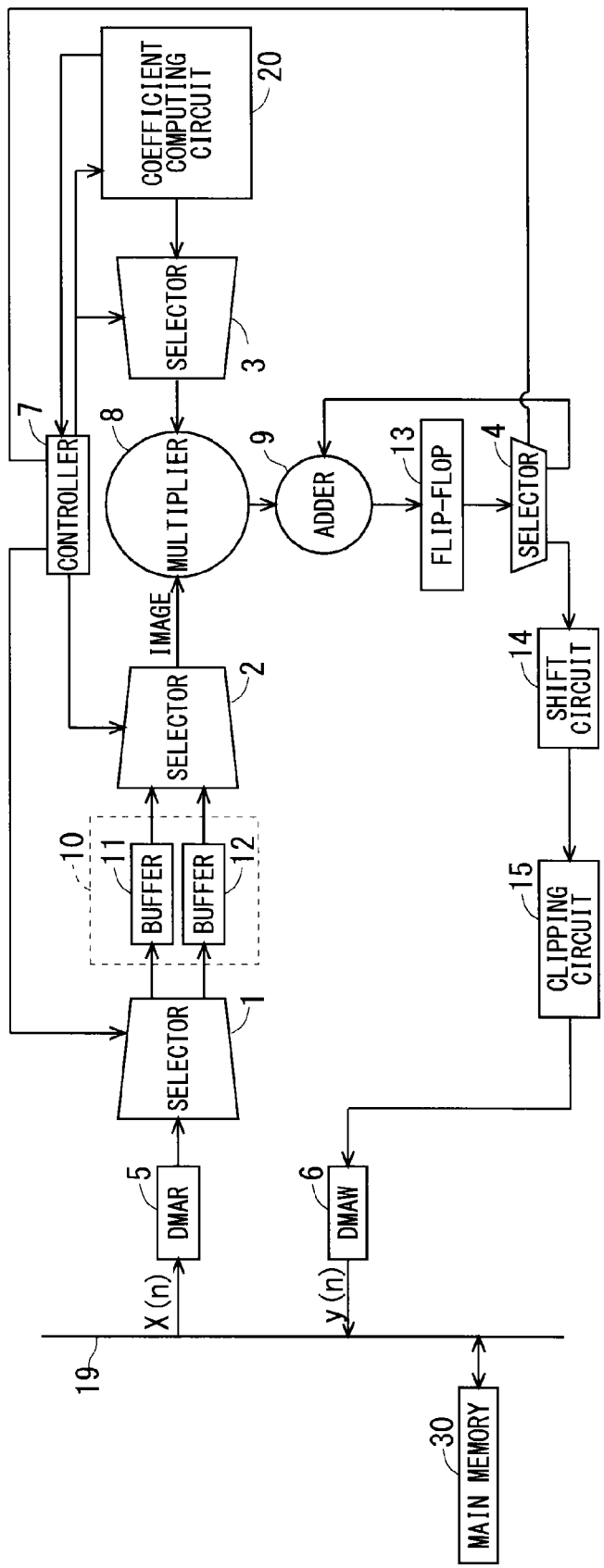
FIG. 7 is a block diagram showing a basic configuration of an image scaling processor according to an embodiment of the present invention.

FIG. 7 is a block diagram showing a basic configuration of an image scaling processor 100 according to an embodiment of the present invention. Description is given below assuming that the scaling processor 100 performs U/D-times arbitrary scaling process shown in FIG. 1.

As shown in FIG. 7, the image scaling processor 100 includes a direct memory access (DMA) reader (DMAR) 5 and a DMA writer (DMAW) 6 as a data input/output section. The DMAR 5 directly reads input image data x(n) stored in a main memory 30 through a DMA bus 19. The DMAW 6 directly writes output image data y(n) into the main memory 30 through the DMA bus 19.

The input image data x(n) for one pixel read by the DMAR 5 is written into a ping-pong buffer 10 through a selector 1. The ping-pong buffer 10 includes a buffer 11 and a buffer 12 connected in parallel to each other between two outputs of the selector 1 and two inputs of a selector 2. The buffers 11 and 12 are controlled to alternately serve for writing and reading in turn. The ping-pong buffer 10 can be composed as a dual port SRAM. The dual port SRAM has two ports for inputting and outputting data. The dual port SRAM can simultaneously read data from one port and write data from the other port and operate as in the case where it has the buffers 11 and 12.

The selector 1 selects a writable buffer from the buffers 11 and 12 and writes input image data x(n) into the selected buffer. The selector 2 reads image data from the buffer, into which the input image data x(n) has been written, of the buffers 11 and 12.

Therefore, at the timing at which, for example, the input image data x(n) is written into the buffer 11, the written input image data x(n) is read from the buffer 12.

A controller 7 controls the selector 1 to select a writable buffer. The controller 7 controls the selector 2 to select a written buffer.

The input image data x(n) read from the ping-pong buffer 10 through the selector 2 is input to a multiplier 8. An interpolation coefficient is output from a coefficient computing circuit 20, which computes an impulse response hUD(n) of the digital filter DF (FIG. 1) as an interpolation coefficient, through the selector 3 and is then input to the multiplier 8.

The controller 7 controls the coefficient computing circuit 20 to calculate interpolation coefficients corresponding to the scaling magnifications such as two times, three times, ½ times, and ¾ times.

The multiplier 8 multiplies the input image data x(n) and the interpolation coefficient hUD(n), and the multiplied data is provided to an adder 9. The adder 9 is provided with the added data stored in a flip-flop 13 through a selector 4 and then adds the provided data to the multiplied data provided from the multiplier 8.

The added data to which the multiplied data has been added is stored in the flip-flop 13, so that the data of the flip-flop 13 is updated. The initial value of the flip-flop 13 is zero, and for image data for an amount of one pixel, the initial value zero is first added to the multiplied data by the adder 9.

The addition by the adder 9 is the cumulative addition of the production of hUD(Dn−Uk) and x(k) expressed by Expression (1). If a plurality of multipliers 8 and a plurality of adders 9 are provided, the operational parallelism is improved, increasing a processing speed.

The selector 4 provides the data stored in the flip-flop 13 to the adder 9 until the cumulative addition of Expression (1) is completed for the image data for an amount of pixels in the preset selection range. After the cumulative addition for the image data for an amount of pixels in the preset selection range is completed, the selector 4 provides the data stored in the flip-flop 13 to the shift circuit 14, so that the flip-flop 13 is initialized to zero. The controller 7 controls the selection by the selector 4.

The shift circuit 14 is composed as, for example, a shift register. The shift circuit 14 shifts the data on the accumulative operation results output from the selector 4 such that a bid count of the output image data is equal to a bit count of the input image data, and then provides the data to a clipping circuit 15. The shift circuit 14 may cause the bit count of the output image data to be equal to the bit count of the input image data, may cause the bit count of the output image data to be larger than that of an input image to increase operation accuracy, or may cause the bit count of the output image data to be smaller that of an input image to reduce operation accuracy.

The clipping circuit 15 clips, in a preset range between a minimum value and a maximum value, the data on the operation results output from the shift circuit 14, which has an adjusted bit counter, to thereby create output image data y(n). The output image data y(n) is directly written into the main memory 30 from the DMAW 6 through the DMA bus 19.

<Method for Creating Output Image Data>

The thus obtained output image data y(n) is image data for an amount of one pixel created based on the input image data for an amount of preset pixels. The same process is performed on the pixels for an amount of preset pixels in different selection ranges, to thereby obtain the next output image data y(n).

The above-mentioned process is iteratively performed on all pixels of one image, so that an image scaled up or down based on Expression (1) is obtained.

The scaling processor 100 shown in FIG. 7 has a configuration in which an impulse response hUD(n) is calculated from a transfer function and an interpolation coefficient is calculated by the coefficient computing circuit 20.

If the interpolation point X shown in FIG. 6 is output y(0), its coordinate is an initial value b0, and a coordinate of an output y(j) is bj, the relationship between the coordinate bj and the coordinate b0 is represented by the first equation of Expression (6), and ti, ti+1, ti+2, and ti+3 are represented by the second to fifth equations of Expression (6).

$$\begin{cases} b_j = b_0 + \text{Pitch} \times j \\ t_1 = t_{i+1} + 1.0 \\ t_{i+1} = b_{j+1} - INT(b_j) \\ t_{i+2} = 1.0 - t_{i+1} \\ t_{i+3} = t_{i+2} + 1.0 \end{cases} \quad (6)$$

Here, INT(bj) of the third equation of Expression (6) represents the operation of dropping the decimal portion of the number from the coordinate bj, and the value of the coordinate bj is defined by a value carried from the integer portion of the last coordinate bj−1.

Expression (6) above can be transformed into Expression (7) below.

$$\begin{cases} b_j = b_{j-1} + \text{Pitch} \\ t_1 = t_{i+1} + 1.0 \\ t_{i+1} = b_j - INT(b_j) \\ t_{i+2} = 1.0 - t_{i+1} \\ t_{i+3} = 2.0 - t_{i+1} \end{cases} \quad (7)$$

Here, the relationship between Pitch and the initial value b0 when an image is scaled to U/D times is described with reference to FIG. 8. FIG. 8 shows D pieces of pixel data of input image, x(0), x(1), . . . , x(D−2), and x(D−1), and U pieces of pixel data of an output image, y(0), y(1), y(2), . . . , y(U/2−1), y(U/2), . . . , y(U−3), y(U−2), and y(U−1).

If the distance between the pieces of pixel data of the input image is 1.0 and the distance between the pieces of pixel data of the output image is Pitch, Expression (8) below can be obtained with reference to FIG. 8.

$$(U-1) \times \text{Pitch} + 2b_0 = D - 1 \quad (8)$$

Here, if Pitch=D/U is substituted into Expression (8), the initial value b0 is represented by Expression (9) below.

$$b_0 = \frac{D - U}{2U} \quad (9)$$

FIG. 8 shows the case in which the center of an image to be input coincides with the center of an image to be output, and in this case, the initial value is b0=−⅙ if U=3 and D=2 (3/2 times).

Figure 9:
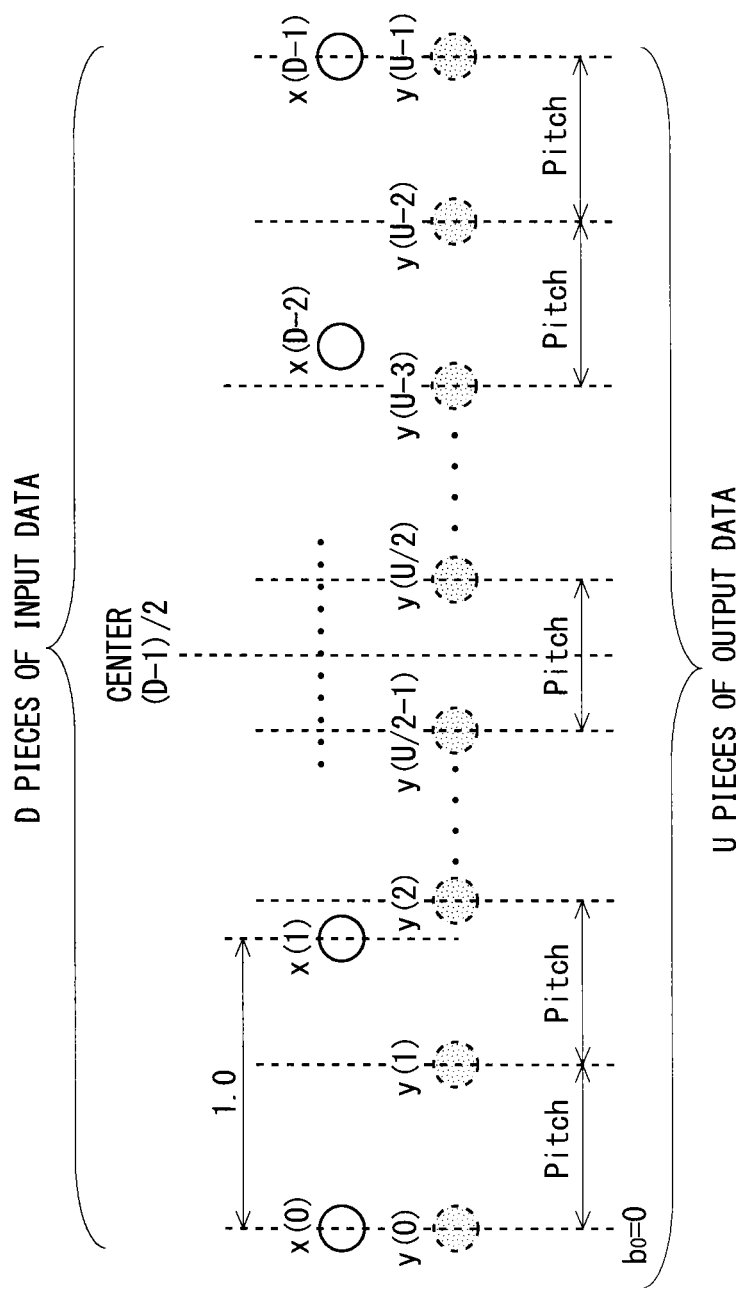
FIG. 9 is another diagram describing the relationship between Pitch and an initial value when an image is scaled to U/D times.

If the center of the image to be input coincides with the center of the image to be output as shown in FIG. 8, the pixel data y(0) and the pixel data y(U−1) are positioned out of the range from the pixel data x(0) to the pixel data x(D−1) of the input image. To position the pixel data y(0) and the pixel data y(U−1) of the output image to coincide with the pixel data x(0) and the pixel data x(D−1) of the input image, respectively, the initial value b0 is set to zero, thereby obtaining the state as shown in FIG. 9. In this case, Pitch is represented by Expression (10) below.

$$\text{Pitch} = \frac{D - 1}{U - 1} \quad (10)$$

In the example in which one interpolation point is set for four pixels, as shown in FIG. 6, pieces of pixel data of an output image can be obtained by shifting the selection range of pixel data of an input image in a predetermined direction. The operation in that example is described with reference to FIGS. 10 to 13.

FIG. 10 schematically shows an operation of creating (interpolating) output image data y(0) that serves as an interpolation point based on pieces of pixel data x(−1), x(0), x(1), x(2) of an input image. The pieces of pixel data x(−1), x(0), x(1), and x(2) are respectively multiplied by the interpolation coefficients calculated by the coefficient computing circuit 20, to thereby obtain the pixel data y(0) of the output image.

The pixel data x(−1) is the pixel data in the leftmost region free from a pixel in an image, pixel data being created by symmetric expansion in which an image is folded back to be used.

FIG. 11 schematically shows an operation of interpolating the pixel data y(1) of the output image that serves as an interpolation point based on the pieces of pixel data x(−1), x(0), x(1), x(2) of the input image. The pieces of pixel data x(−1), x(0), x(1), and x(2) are respectively multiplied by the interpolation coefficients calculated by the coefficient computing circuit 20, to thereby obtain the pixel data y(1) of the output image.

FIG. 12 schematically shows an operation of shifting (skipping) the selection range of pixel data rightward by one pixel and interpolating the pixel data y(2) of the output image that serves as an interpolation point based on the pieces of pixel data x(0), x(1), x(2), and x(3) of the input image. The pieces of pixel data x(0), x(1), x(2), and x(3) are respectively multiplied by the interpolation coefficients calculated by the coefficient computing circuit 20, to thereby obtain the pixel data y(2) of the output image.

FIG. 13 schematically shows an operation of skipping the selection range of pixel data rightward by one pixel and interpolating the pixel data y(3) of an output image that serves as an interpolation point based on the pieces of pixel data x(1), x(2), x(3), and x(4) of the input image. The pieces of pixel data x(1), x(2), x(3), and x(4) are respectively multiplied by the interpolation coefficients calculated by the coefficient computing circuit 20, to thereby obtain the pixel data y(3) of the output image.

In the calculation of the pixel data y(4) of the output image, the selection range of pixel data is not skipped and the interpolation coefficient is merely changed.

As described above, the selection range of pixel data of an input image, which serves as an interpolation target, is skipped rightward by every predetermined number of pixels from the left end of the image, or the selection range is not skipped and the interpolation coefficient calculated by the coefficient computing circuit 20 is multiplied, so that the output image data is obtained.

The number of skips for the selection range of pixel data of an input image can be determined by Expression (11) below.

$$\text{Skip} = \lfloor b_{j+1} \rfloor - \lfloor b_j \rfloor \quad (11)$$

Expression (11) above represents the floor function, where the coordinates of adjacent pixels are each indicated by the floor functions, indicating that the number of skips is determined from a difference between the floor functions. The floor function is the function for converting a numeric value into an integer. For example, "1.5" is processed into "1" and "2.5" is processed into "2" with the floor function.

The method described above can obtain pieces of output image data based on pieces of input image data for an amount of pixels set in advance.

<Method for Calculating Interpolation Coefficient>

Various methods are conceivable for calculating an interpolation coefficient. For example, Expression (4) describing the interpolation using cubic convolution can be transformed into Expression (12) below such that the interpolation is achieved through only integer multiplication, integer addition and subtraction, and data shifting.

$$\begin{cases} h(t_i)' = \text{round}(h(t_i) * 2^n) \\ h(t_{i+1})' = \text{round}(h(t_{i+1}) * 2^n) \\ h(t_{i+2})' = \text{round}(h(t_{i+2}) * 2^n) \\ h(t_{i+3})' = 2^n - (h(t_i)' + h(t_{i+1})' + h(t_{i+2})') \end{cases} \quad (12)$$

In Expression (12), a value obtained by multiplying the interpolation function h(ti) by 2 raised to the n-th power, 2n (n represents the coefficient accuracy, which is a positive integer) and then rounding the resultant value is h(ti)', a value obtained by multiplying the interpolation function h(ti+1) by 2n and then rounding the resultant value is h(ti+1)', a value obtained by multiplying the interpolation function h(ti+2) by 2n and then rounding the resultant value is h(ti+2)', and a value obtained by subtracting h(ti)', h(ti+1)', and h(ti+2)' from 2n is h(ti+3)'. From the above, in the case where Expression (12) above is implemented in the coefficient computing circuit 20 shown in FIG. 7, the interpolation coefficient corresponding to the distance ti+3 can be calculated through subtraction.

Figure 14:
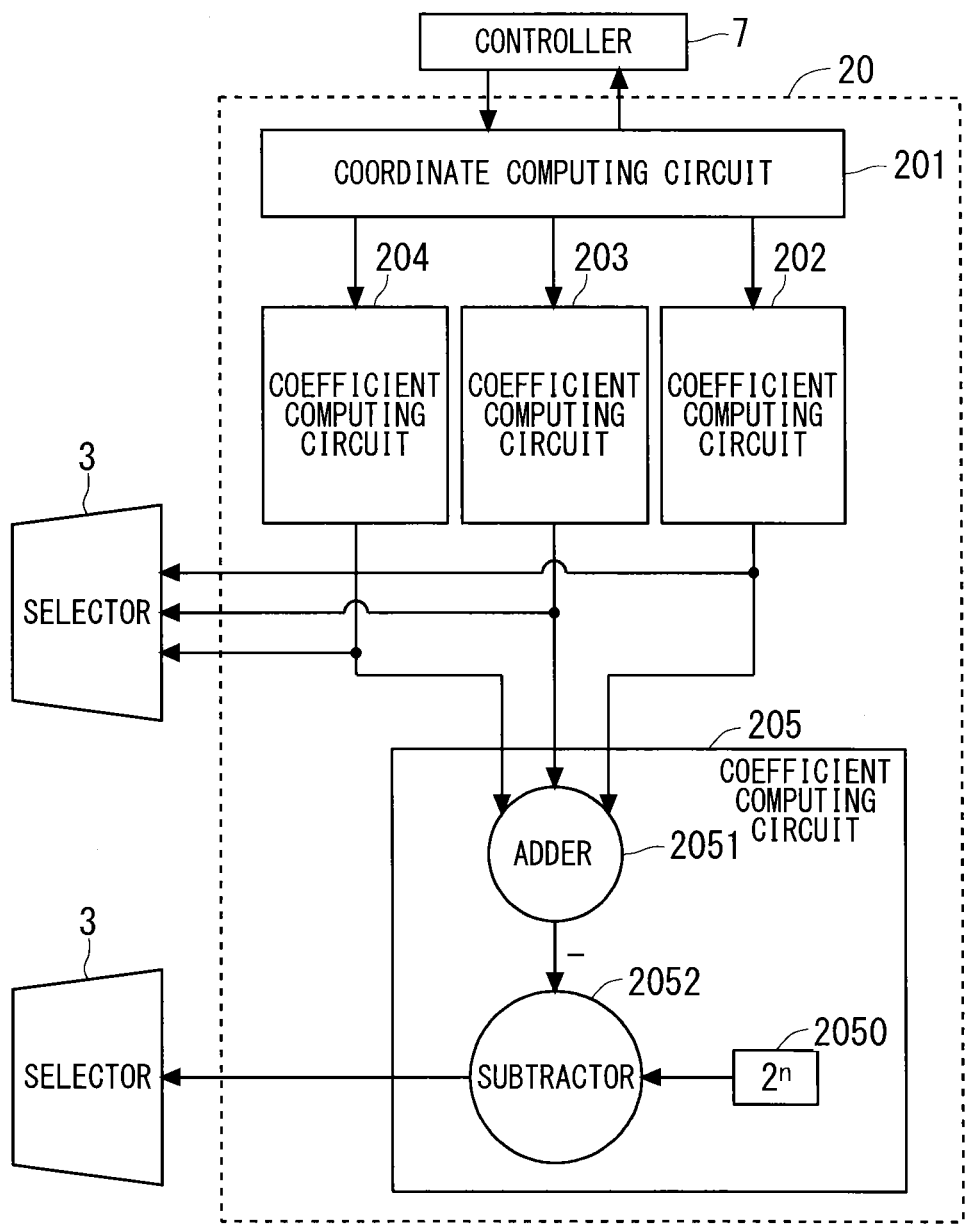
FIG. 14 is a block diagram showing a configuration of a coefficient computing circuit.

FIG. 14 is a block diagram showing the configuration of the coefficient computing circuit 20. As shown in FIG. 14, the coefficient computing circuit 20 includes a coordinate computing circuit 201 connected to the controller 7, coefficient computing circuits 202, 203, and 204 connected to the coordinate computing circuit 201, and a coefficient computing circuit 205 that receives outputs from the coefficient computing circuits 202 to 204. The outputs from the coefficient computing circuits 202 to 204 are each provided to the selector 3 as well.

The coefficient computing circuit 205 includes an adder 2051 that adds up the outputs of the coefficient computing circuits 202 to 204 and a subtractor 2052 that subtracts the value obtained by adding up the outputs of the coefficient computing circuits 202 to 204 from 2n set by an accuracy setting unit 2050. The coefficient computing circuit 205 provides an output of the subtractor 2052 to the selector 3. The accuracy setting unit 2050 is a portion that sets the value of n according to the accuracy of the interpolation coefficient. If the accuracy of the interpolation coefficient is 10 bits, n=–10 and 210=1024.

The coefficient computing circuit 20 starts an operation in response to a control signal from the controller 7, and the coordinate computing circuit 201 calculates the coordinate bj of the interpolation point based on Expression (7).

Figure 15:
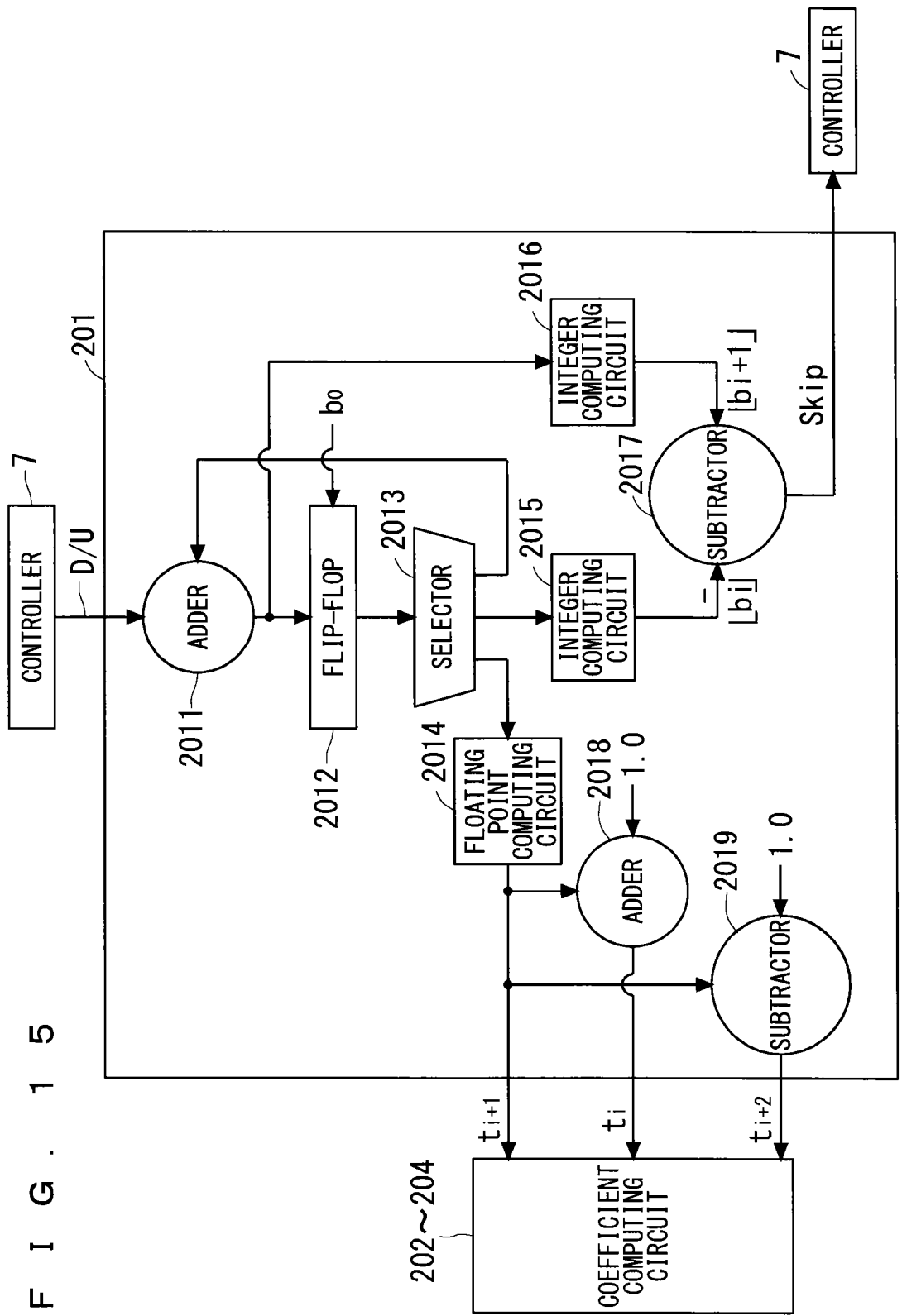
FIG. 15 is a block diagram showing a configuration of a coordinate computing circuit.

Now, the configuration of the coordinate computing circuit 201 when Expression (12) is implemented in the coefficient computing circuit 20 is described with reference to FIG. 15. As shown in FIG. 15, the coordinate computing circuit 201 includes an adder 2011 connected to the controller 7, a flip-flop 2012 that receives an output from the adder 2011, and a selector 2013 that branches the output from the flip-flop 2012 and then outputs the branched output. The selector 2013 provides the outputs of the flip-flop 2012 to a floating point computing circuit 2014, an integer computing circuit 2015, and the adder 2011. The floating point computing circuit 2014 performs an operation of dropping the decimal portion of the operation result and then outputs the result as ti+1. The distance ti+1 is used to calculate another distance, and thus is also referred to as a reference distance for conveniences' sake.

The output of the floating point computing circuit 2014 is provided to an adder 2018. The adder 2018 adds the output and a numeric value 1.0 and then outputs the result as ti.

The output of the floating point computing circuit 2014 is provided to a subtractor 2019. The subtractor 2019 subtracts the output from a numeric value 1.0 and then outputs the result as ti+2.

The coordinate computing circuit 201 is provided with Pitch as D/U from the controller 7, and adds the previously obtained coordinate of the interpolation point to Pitch, to thereby obtain a new coordinate of the interpolation point. In the first coordinate calculation, an initial value b0 is provided to a flip-flop 2012 and is then added to D/U, the result thereof being the coordinate bj.

In the subsequent calculation of the coordinate of an interpolation point, the adder 2011 adds the current coordinate bj stored in the flip-flop 2012 and D/U, to thereby obtain the next coordinate bj+1.

The integer computing circuit 2015 performs an operation of converting an output from the flip-flop 2012 into an integer with the floor function. Then, the operation result is subtracted from the operation result of the integer computing circuit 2016, which converts an output from the adder 2011 into an integer with the floor function, by the subtractor 2017, so that the number of skips is calculated. The calculated number of skips is provided to the controller 7. The operation described above corresponds to the operation described with reference to Expression (11).

Once the coordinate bj of the interpolation point is obtained, ti, ti+1, and ti+2 are obtained. Thus, the coefficient computing circuits 202 to 204 obtain the interpolation functions h(ti), h(ti+1), and h(ti+2) from Expression (4) and calculate, based on Expression (12), the interpolation coefficients h(ti)', h(ti+1)', and h(ti+2)', respectively. The coefficient computing circuit 205 calculates as the interpolation coefficient h(ti+3)', a value obtained by subtracting the interpolation coefficients h(ti)', h(ti+1)', and h(ti+2)' from 2n.

The interpolation coefficients are provided to the multiplier 8 through the selector 3 and are then multiplied by the pixel data of an input image.

As described above, the coordinate computing circuit 201 also calculates the number of skips, which indicates that the selection range of pixel data of an input image is skipped, with reference to Expression (11) and then provides the number of skips to the controller 7. The controller 7 determines, based on the number of skips, the pixel data of an input image to be the next operation target.

Now, the calculation of interpolation coefficients by the coefficient computing circuits 202 to 204 is described with reference to FIGS. 16 and 17.

Figure 16:
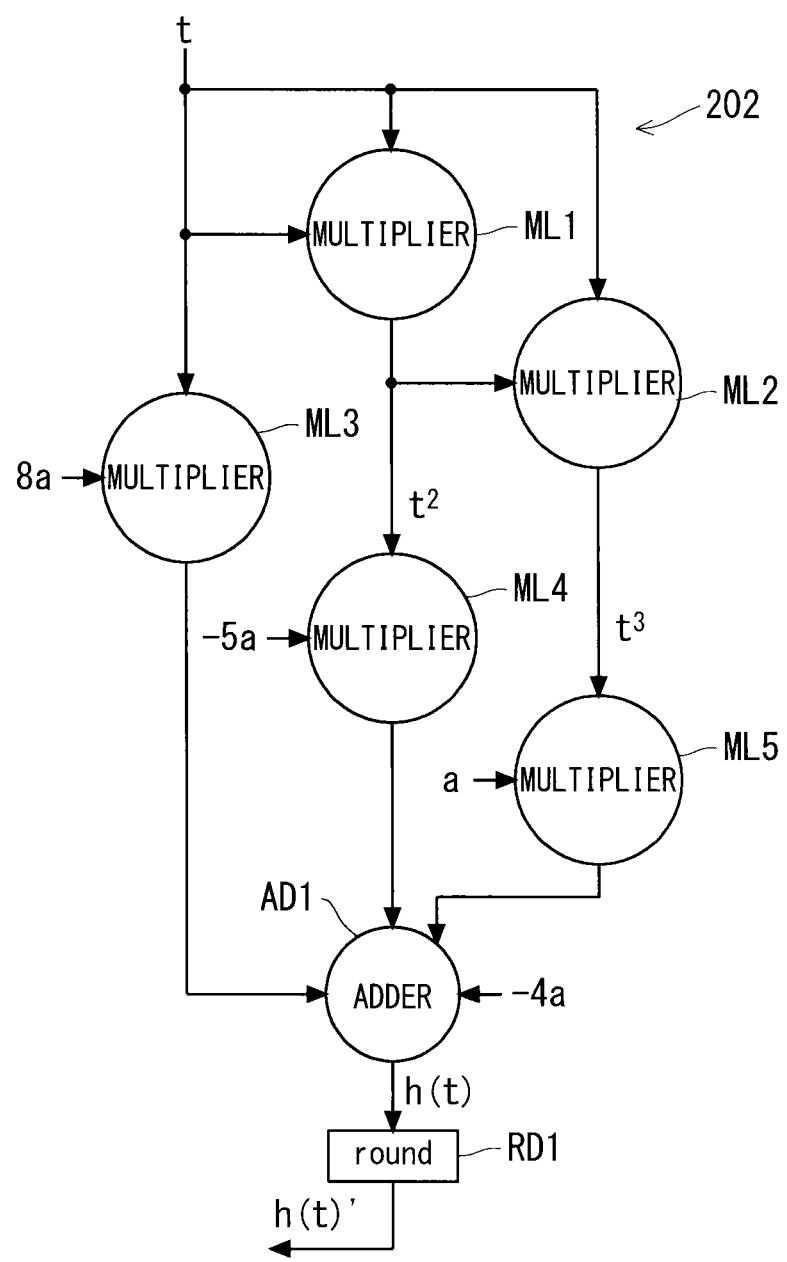
FIG. 16 is a block diagram showing a configuration of a coefficient computing circuit.

FIG. 16 is a system diagram showing a coefficient operation of calculating the interpolation coefficients h(ti)' and h(ti+3)', which also shows the configuration of the coefficient computing circuit 202.

In FIG. 16, "t" denotes the value of the distance ti or ti+3 output from the coordinate computing circuit 201, which is indicated by "t" for easy understanding. In the case where Expression (12) is implemented as described above, the interpolation coefficient of the distance ti+3 is calculated by the coordinate computing circuit 205, and accordingly, the coefficient computing circuit 202 calculates the interpolation coefficient h(ti)'.

As shown in FIG. 16, the coefficient computing circuit 202 multiplies the values t output from the coordinate computing circuit 201 together by a multiplier ML1 to calculate t2, and multiplies the value t2 output from the multiplier ML1 and the value t output from the coordinate computing circuit 201 together by a multiplier ML2 to calculate t3.

Then, multipliers ML3, ML4, and ML5 multiply t, t2, and t3 by constants 8a, −5a, and a, respectively, and an adder AD1 adds the operation results and −4a, to thereby obtain a function h(t). Then, for example, a round computing circuit RD1 rounds off the operation result of the function h(t), to thereby obtain an interpolation coefficient h(t)'. In this case, the interpolation coefficient h(t)' is the interpolation coefficient h(ti)'.

Figure 17:
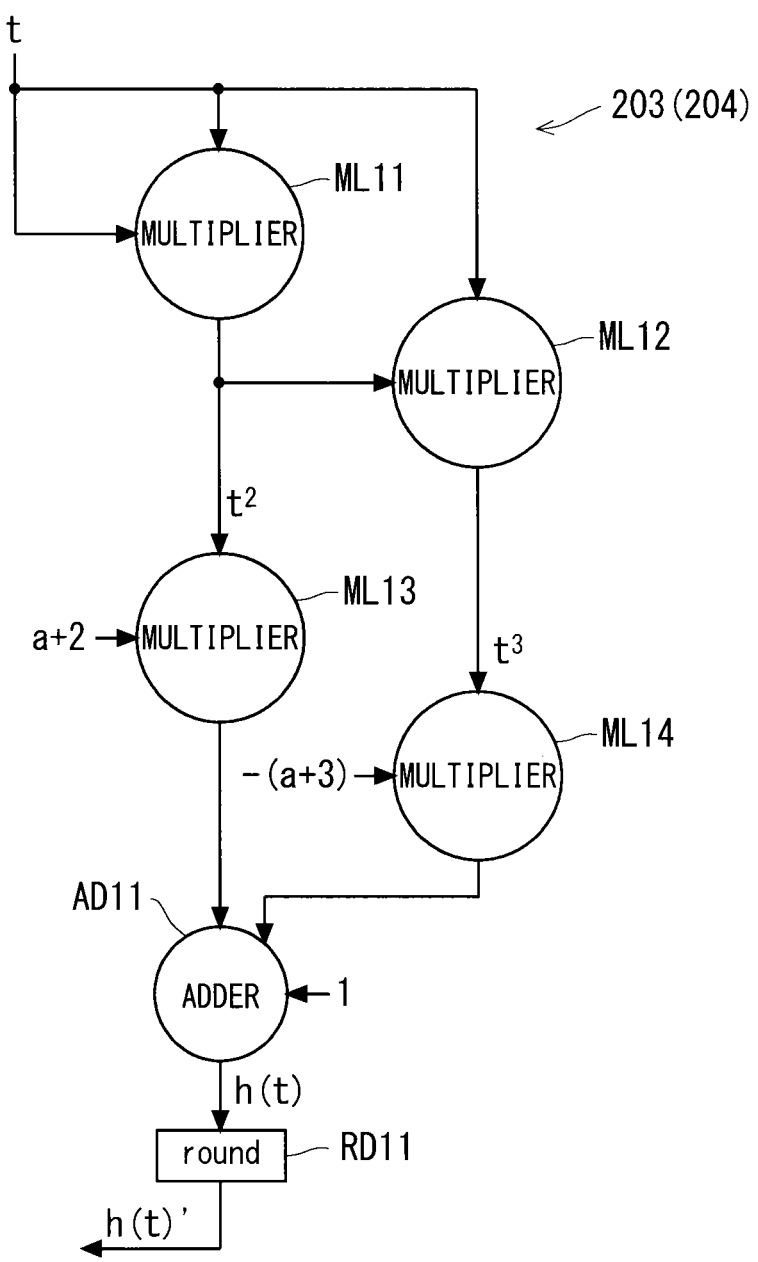
FIG. 17 is a block diagram showing a configuration of a coefficient computing circuit.

FIG. 17 is a system diagram showing a coefficient operation of calculating the interpolation coefficients h(ti+1)' and h(ti+2)', which also shows the configurations of the coefficient computing circuits 203 and 204.

In FIG. 17, "t" represents the value of ti+1 or ti+2 output from the coordinate computing circuit 201 and is indicated by "t" for easy understanding.

As shown in FIG. 17, the coefficient computing circuit 203 (204) multiplies the values t output from the coordinate computing circuit 201 together by a multiplier ML11 to calculate t2, and multiplies the value t2 output from the multiplier ML11 and the value t output from the coordinate computing circuit 201 by a multiplier ML12 to calculate t3.

Then, the multipliers ML13 and ML14 multiply t2 and t3 by constants a+2 and −(a+3), respectively, and the adder AD11 adds the operation results and one, to thereby obtain a function h(t). Then, for example, a round computing circuit RD11 rounds off the operation result of the function h(t), to thereby obtain an interpolation coefficient h(t)'. In this case, the interpolation coefficient h(t)' is the interpolation coefficient h(ti+1)' or h(ti+2)'.

<Modifications>

As expressed by Expression (12) above, h(ti)', h(ti+1)', and h(ti+2)' are individually obtained, and then, the value obtained by subtracting h(ti)', h(ti+1)', and h(ti+2)' from 2n is taken as h(ti+3)'. The present invention, however, is not limited to this.

For example, as indicated by Expression (13) below, h(ti)' may be obtained by individually obtaining h(ti+1)', h(ti+2)', and h(ti+3)' and then subtracting h(ti+1)', h(ti+2)', and h(ti+3)' from 2n.

$$\begin{cases} h(t_i)' = 2^n - (h(t_{i+1})' + h(t_{i+2})' + h(t_{i+3})') \\ h(t_{i+1})' = \text{round}(h(t_{i+1}) * 2^n) \\ h(t_{i+2})' = \text{round}(h(t_{i+2}) * 2^n) \\ h(t_{i+3})' = \text{round}(h(t_{i+3}) * 2^n) \end{cases} \quad (13)$$

Figure 18:
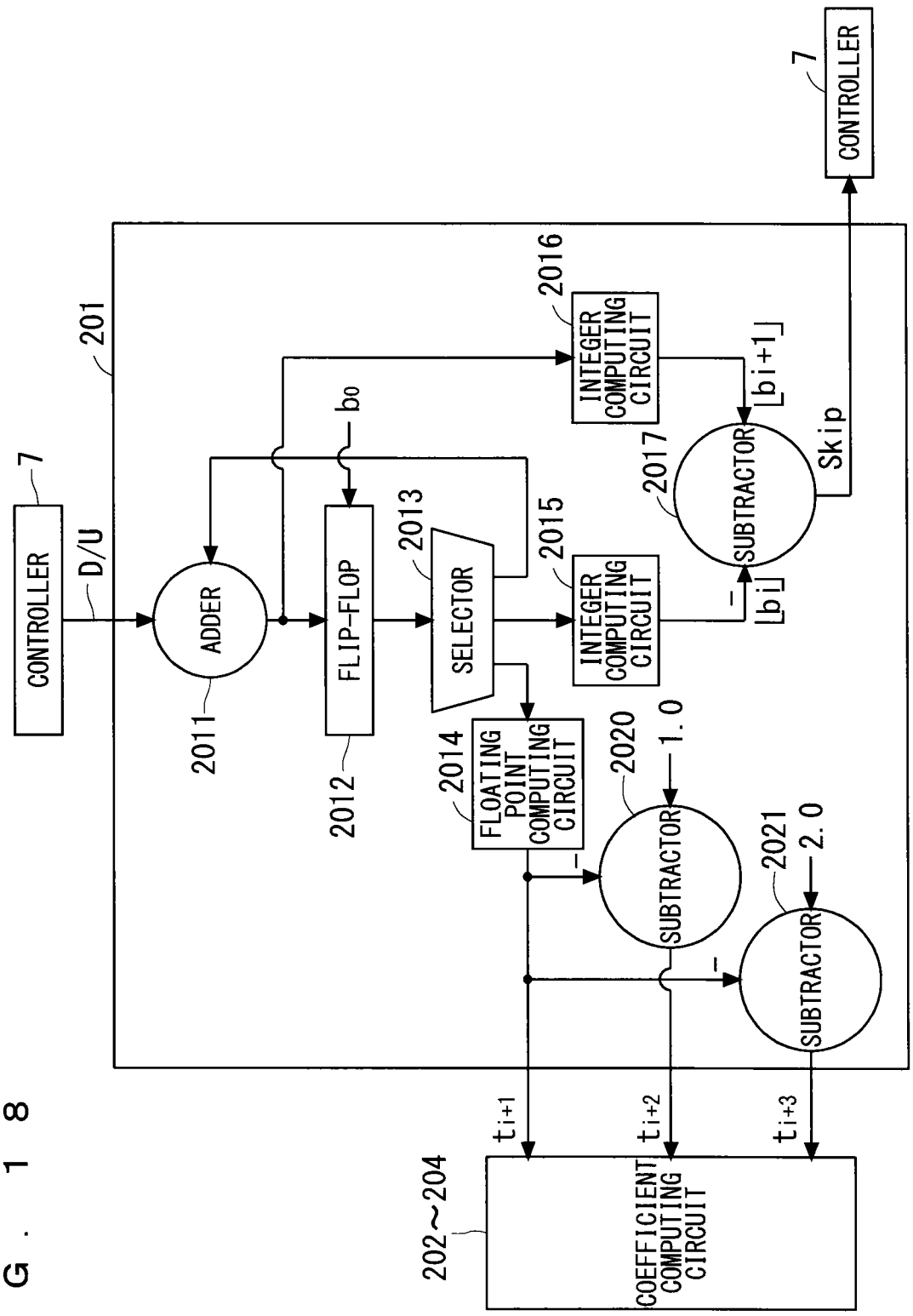
FIG. 18 is a block diagram showing a configuration of a modification of the coordinate computing circuit.

The configuration of the coordinate computing circuit 201 in a case where Expression (13) is implemented in the coefficient computing circuit 20 is described with reference to FIG. 18. As shown in FIG. 18, the coordinate computing circuit 201 includes the adder 2011 connected to the controller 7, the flip-flop 2012 that receives an output from the adder 2011, and the selector 2013 that branches the output from the flip-flop 2012 to output the branched output. The selector 2013 provides the outputs from the flip-flop 2012 to the floating point computing circuit 2014, the integer computing circuit 2015, and the adder 2011. The floating point computing circuit 2014 performs an operation of dropping the decimal portion of the operation result and outputs the operation result as ti+1.

The output from the floating point computing circuit 2014 is provided to a subtractor 2020. The subtractor 2020 subtracts the output from a numeric value 1.0 and outputs the result as ti+2.

The output from the floating point computing circuit 2014 is provided to a subtractor 2021. The subtractor 2021 subtracts the output from a numeric value 2.0 and outputs the result as ti+3.

In this case, the distances ti+1, ti+2, and ti+3 are provided to the coefficient computing circuits 202 to 204, respectively. For this reason, the coefficient computing circuits 202 and 203 are configured to perform the coefficient operation shown in FIG. 17; the coefficient computing circuit 204 is configured to perform the coefficient operation shown in FIG. 16.

The same components as those of the coordinate computing circuit 201 shown in FIG. 15 are denoted by the same reference numerals, and redundant description is omitted.

Alternatively, as indicated by Expression (14) below, h(ti+1)' may be obtained by individually obtaining h(ti)', h(ti+2)', and h(ti+3)' and then subtracting h(ti)', h(ti+2)', and h(ti+3)' from 2n.

$$\begin{cases} h(t_i)' = \text{round}(h(t_i) * 2^n) \\ h(t_{i+1})' = 2^n - (h(t_i)' + h(t_{i+2})' + h(t_{i+3})') \\ h(t_{i+2})' = \text{round}(h(t_{i+2}) * 2^n) \\ h(t_{i+3})' = \text{round}(h(t_{i+3}) * 2^n) \end{cases} \quad (14)$$

Figure 19:
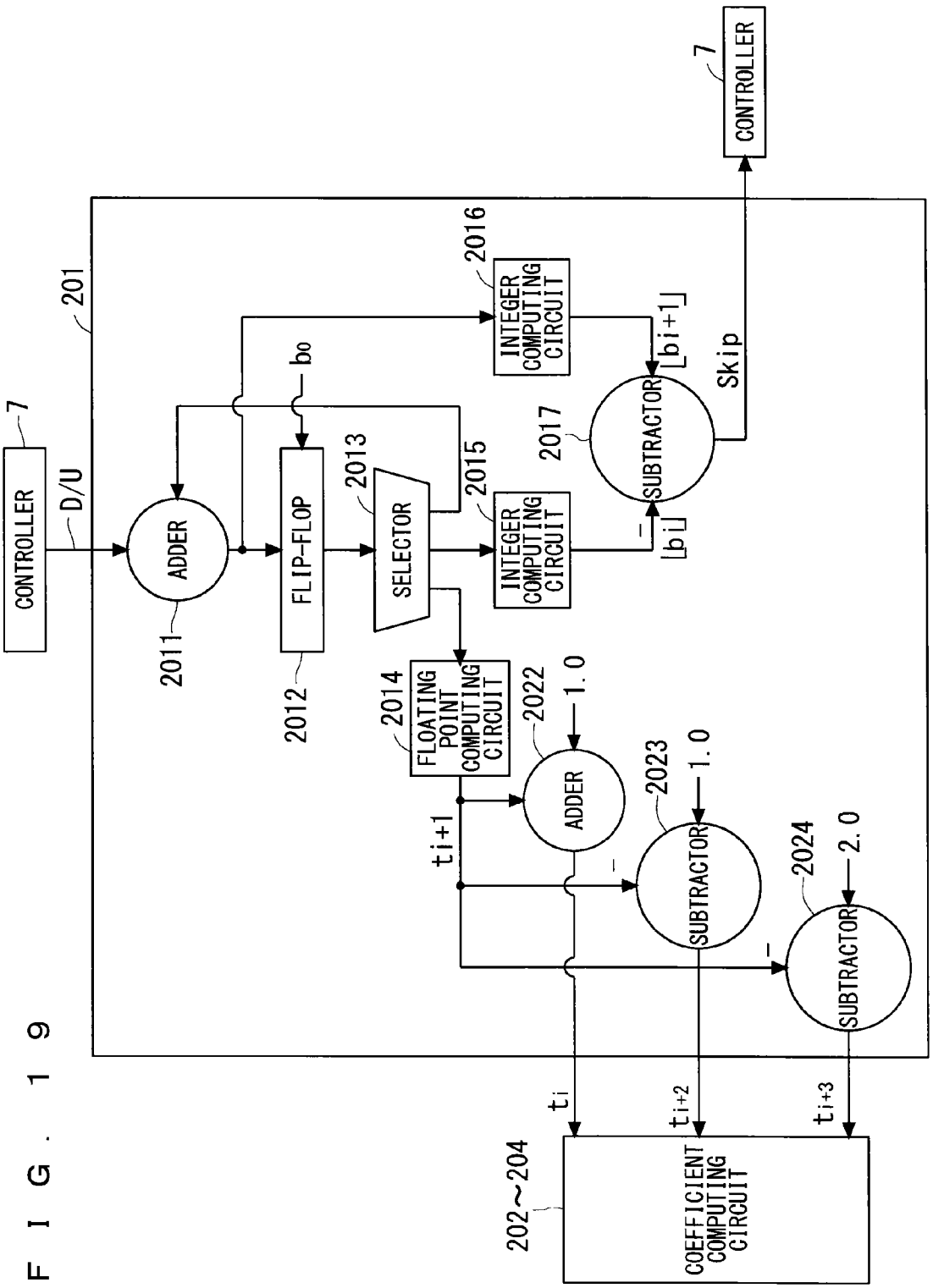
FIG. 19 is a block diagram showing a configuration of another modification of the coordinate computing circuit.

The configuration of the coordinate computing circuit 201 in a case where Expression (14) is implemented in the coefficient computing circuit 20 is described with reference to FIG. 19. As shown in FIG. 19, the coordinate computing circuit 201 includes the adder 2011 connected to the controller 7, the flip-flop 2012 that receives an output from the adder 2011, and the selector 2013 that branches the output from the flip-flop 2012 to output the branched output. The selector 2013 provides the output from the flip-flop 2012 to the floating point computing circuit 2014, the integer computing circuit 2015, and the adder 2011. The floating point computing circuit 2014 performs an operation of dropping the decimal portion of the operation result and outputs the operation result as ti+1.

The output from the floating point computing circuit 2014 is provided to an adder 2022. The adder 2022 adds a numeric value 1.0 and the output and outputs the result as ti.

The output from the floating point computing circuit 2014 is provided to a subtractor 2023. The subtractor 2023 subtracts the output from a numeric value 1.0 and outputs the result as ti+2.

The output from the floating point computing circuit 2014 is provided to a subtractor 2024. The subtractor 2024 subtracts the output from a numeric value 2.0 and outputs the result as ti+3.

In this case, the distances ti, ti+2, and ti+3 are provided to the coefficient computing circuits 202 to 204, respectively. For this reason, the coefficient computing circuits 202 and 204 are configured to perform the coefficient operation shown in FIG. 16; the coefficient computing circuit 203 is configured to perform the coefficient operation shown in FIG. 17.

The same components as those of the coordinate computing circuit 201 shown in FIG. 15 are denoted by the same reference numerals, and redundant description is omitted.

Alternatively, as indicated by Expression (15) below, h(ti+2)' may be obtained by individually obtaining h(ti)', h(ti+1)', and h(ti+3)' and then subtracting h(ti)', h(ti+1)', and h(ti+3)' from 2n.

$$\begin{cases} h(t_i)' = \text{round}(h(t_i) * 2^n) \\ h(t_{i+1})' = \text{round}(h(t_{i+1}) * 2^n) \\ h(t_{i+2})' = 2^n - (h(t_i)' + h(t_{i+2})' + h(t_{i+3})') \\ h(t_{i+3})' = \text{round}(h(t_{i+3}) * 2^n) \end{cases} \quad (15)$$

Figure 20:
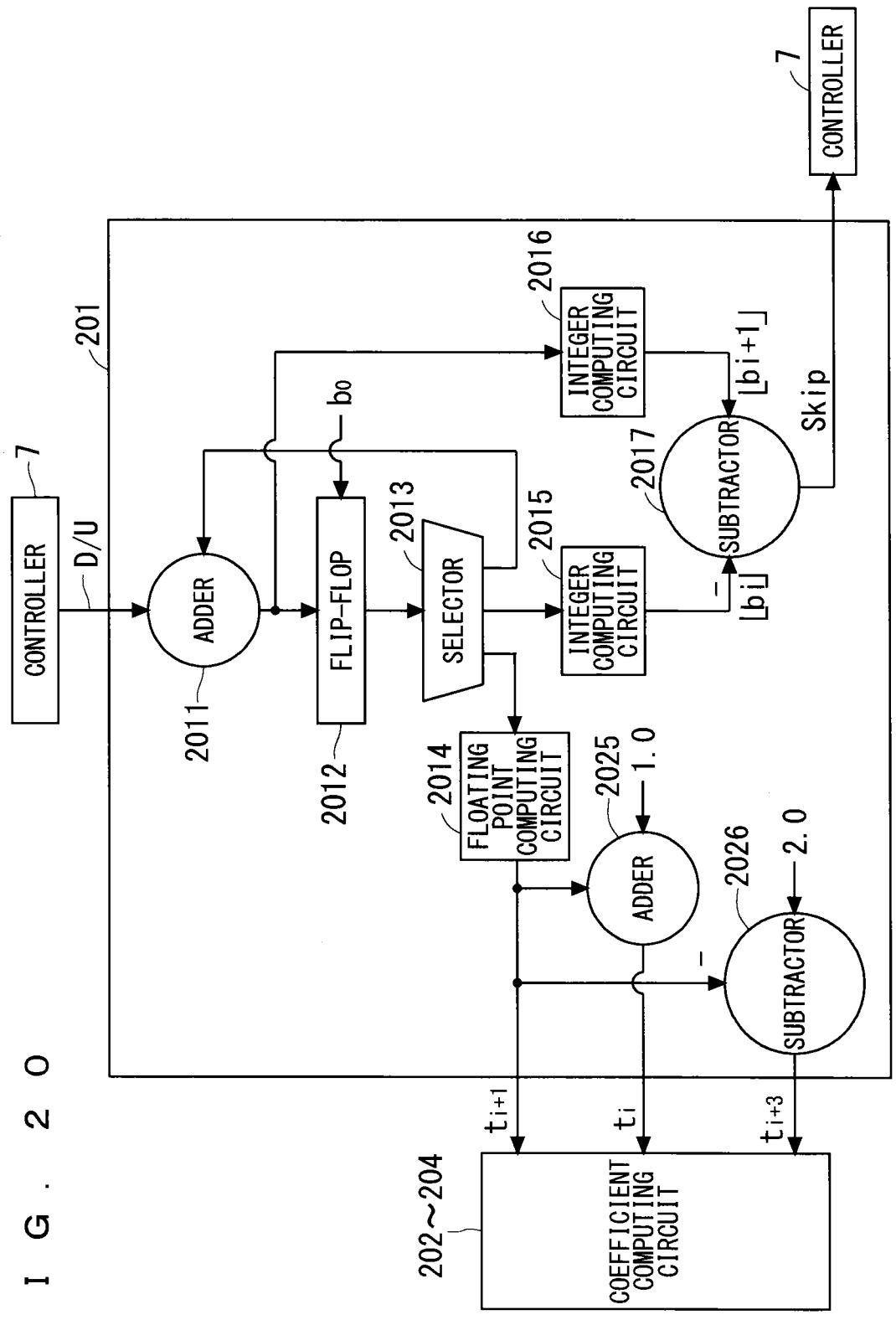
FIG. 20 is a block diagram showing a configuration of still another modification of the coordinate computing circuit.

The configuration of the coordinate computing circuit 201 in a case where Expression (15) is implemented in the coefficient computing circuit 20 is described with reference to FIG. 20. As shown in FIG. 20, the coordinate computing circuit 201 includes the adder 2011 connected to the controller 7, the flip-flop 2012 that receives an output from the adder 2011, and the selector 2013 that branches the output from the flip-flop 2012 to output the branched output. The selector 2013 provides the output from the flip-flop 2012 to the floating point computing circuit 2014, the integer computing circuit 2015, and the adder 2011. The floating point computing circuit 2014 performs an operation of dropping the decimal portion of the operation result and outputs the operation result as ti+1.

The output from the floating point computing circuit 2014 is provided to an adder 2025. The adder 2025 adds the output and a numeric value 1.0 and outputs the result as ti.

The output from the floating point computing circuit 2014 is provided to a subtractor 2026. The subtractor 2026 subtracts the output from a numeric value 2.0 and outputs the result as ti+3.

In this case, the distances ti, ti+1, and ti+3 are provided to the coefficient computing circuits 202 to 204, respectively. For this reason, the coefficient computing circuits 202 and 204 are configured to perform the coefficient operation shown in FIG. 16; the coefficient computing circuit 203 is configured to perform the coefficient operation shown in FIG. 17.

The same components as those of the coordinate computing circuit 201 shown in FIG. 15 are denoted by the same reference numerals, and redundant description is omitted.

Although the description has been given of the case in which an image is scaled up, the present invention is also be applicable to the case in which an image is scaled down.

Although the description has been given of horizontal image scaling, the present invention is also applicable to vertical image scaling, so that an image is scaled. In such a case, the invention may be applied individually to the horizontal direction and the vertical direction.

<Implementation in Processor>

Although the description has been given of the configuration in which the image scaling process is implemented in hardware, the image scaling process can also be implemented in software operating on a processor, such as a central processing unit (CPU) or a digital signal processor (DSP).

Figure 21:
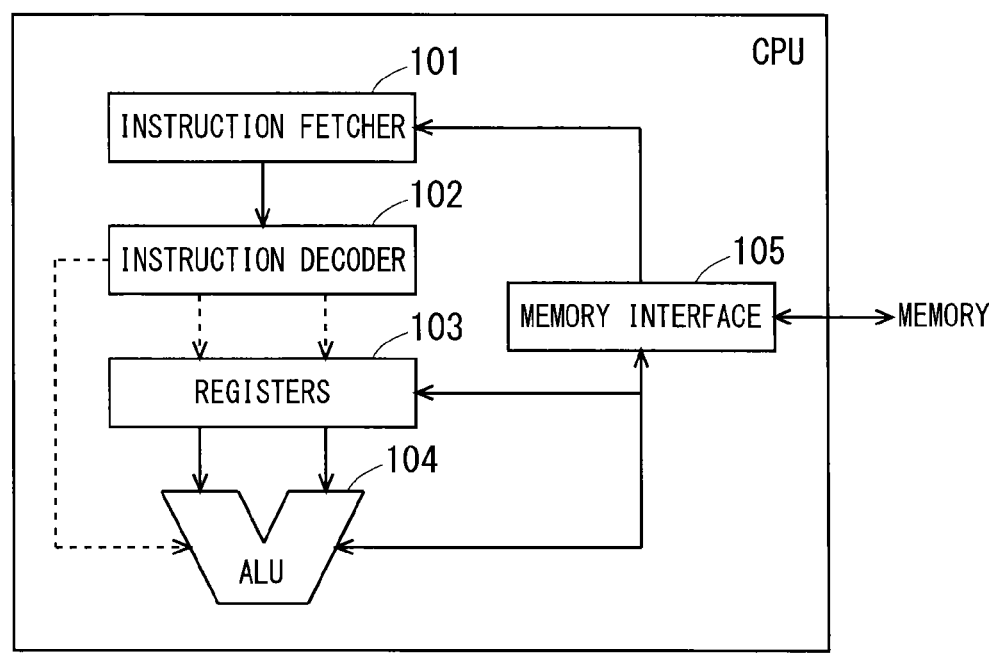
FIG. 21 is a block diagram describing a configuration of a processor.

The CPU commonly has the configuration as shown in FIG. 21. The CPU includes an instruction fetcher 101 that reads instructions from memory, an instruction decoder 102 that executes the instructions read by the instruction fetcher 101, registers 103 operating as the memory in the CPU, an arithmetic and logic unit (ALU) 104 that executes the arithmetic operations such as the four arithmetic operations and logical operations based on the data stored in the registers 103, and a memory interface 105 that exchanges data with an external memory (not shown).

For an image scaling process according to the present invention on the processor having the above-mentioned configuration, to interpolate pixels of input data and convert the input image data to U/D times (U and D are natural numbers) as output image data, the ALU 104 is used to perform a coefficient operation of preliminarily calculating interpolation coefficients to be used in the scaling process, and then, the calculated interpolation coefficients are stored in the registers 103 or memory (not shown).

The ALU 104 executes the steps of: multiplying the input image data by the interpolation coefficients stored in the registers 103 or memory (not shown) such that the interpolation coefficients respectively correspond to input pixels constituting the input image data; iteratively adding pieces of multiplied data obtained and obtaining a total sum of the pieces of multiplied data for a predetermined number of the input pixels; outputting a total sum of the pieces of multiplied data at a timing at which the total sum of the pieces of multiplied data is obtained for the predetermined number of the input pixels; and shifting the total sum of the pieces of multiplied data obtained to adjust a bit count of the output image data to a bit count of the input image data. Therefore, the image scaling process can be implemented.

The embodiments of the present invention may be combined as appropriate, modified or omitted as appropriate within the scope of the invention.

What is claimed is:

1. An image scaling processor that performs an image scaling process of interpolating pixels of input image data and converting the input image data to U/D times (U and D are natural numbers) as output image data, the processor comprising:

a coefficient computing circuit that calculates interpolation coefficients to be used in said image scaling process;

a multiplier that multiplies said input image data by said interpolation coefficients provided from said coefficient computing circuit such that said interpolation coefficients respectively correspond to input pixels constituting said input image data;

an adder that iteratively adds pieces of multiplied data output from said multiplier and obtains a total sum of said pieces of multiplied data for a predetermined number of said input pixels;

a selector that outputs a total sum of said pieces of multiplied data at a timing at which the total sum of said pieces of multiplied data is obtained for the predetermined number of said input pixels; and a shift circuit that shifts an output of said selector to adjust a bit count of said output image data to a bit count of said input image data, wherein said coefficient computing circuit includes:
  a coordinate computing circuit that calculates a coordinate of an interpolation point of a pixel to be interpolated for said input image data; and
  a plurality of coefficient computing circuits that respectively output interpolation coefficients corresponding to said predetermined number of said input pixels, one of said plurality of coefficient computing circuits subtracts a sum of said interpolation coefficients calculated by the other coefficient computing circuits from a value of 2 raised by a predetermined number to calculate the other interpolation coefficient, and said interpolation coefficients calculated by said coefficient computing circuit are converted into integers such that a total sum thereof is equal to 2 raised by said predetermined number.

2. The image scaling processor according to claim 1, wherein
  said coordinate computing circuit adds D/U to the obtained coordinate of the interpolation point to calculate coordinates of subsequent interpolation points, the coordinate of first one of the subsequent interpolation points being calculated through addition of D/U to a predetermined initial value, and
  said coordinate computing circuit performs an operation of dropping a decimal portion of the calculated coordinate of the interpolation point, takes the operation result as a reference distance between said interpolation point and one of said predetermined number of said input pixels, calculates distances between said interpolation point and the other input pixels of said predetermined number of said input pixels based on said reference distance, and provides said other coefficient computing circuits with said calculated distances and said reference distance as distances between said interpolation point and said input pixels.

3. The image scaling processor according to claim 2, wherein said coordinate computing circuit converts a coordinate of a current interpolation point and a coordinate of a subsequent interpolation point into integers, and determines, depending on a difference value between the coordinates, the number of skips that defines to shift or not to shift a selection range in units of said predetermined number of input pixels by every predetermined number of pixels.

4. The image scaling processor according to claim 2, wherein each of said other coefficient computing circuits multiplies said distances between said interpolation point and said input pixels provided from said coordinate computing circuit and multiplies the resultant value by a predetermined coefficient to compute an interpolation function corresponding to said input distances between said interpolation point and said input pixels, and rounds off an operation result of said interpolation function, to thereby calculate an interpolation coefficient corresponding to said input distances between said interpolation point and said input pixels.

5. An image scaling processing method for performing an image scaling process of interpolating pixels of input image data and converting the input image data to U/D times (U and D are natural numbers) as output image data, the method comprising the steps of:
  (a) calculating interpolation coefficients to be used in said image scaling process;
  (b) multiplying said input image data by said interpolation coefficients obtained in said step (a) such that said interpolation coefficients respectively correspond to input pixels constituting said input image data;
  (c) iteratively adding pieces of multiplied data obtained in said step (b) and obtaining a total sum of said pieces of multiplied data for a predetermined number of said input pixels;
  (d) outputting a total sum of said pieces of multiplied data at a timing at which the total sum of said pieces of multiplied data is obtained for the predetermined number of said input pixels; and
  (e) shifting the total sum of said pieces of multiplied data obtained in said step (d) to adjust a bit count of said output image data to a bit count of said input image data, wherein said step (a) includes
    calculating a coordinate of an interpolation point of a pixel to be interpolated for said input image data, and
    performing multiple coefficient operations respectively calculating interpolation coefficients corresponding to said predetermined number of said input pixels,
  one of said multiple coefficient operations subtracts a sum of said interpolation coefficients calculated by the other coefficient operations from a value of 2 raised by a predetermined number to calculate the other interpolation coefficient, and
  said interpolation coefficients calculated in said step (a) are converted into integers such that a total sum thereof is equal to 2 raised by a said predetermined number.

\* \* \* \* \*